(12) United States Patent
Kabir et al.

(10) Patent No.: US 11,628,418 B1
(45) Date of Patent: Apr. 18, 2023

(54) PSA-FUNCTIONALIZED SOL-GEL SORBENT MATERIALS AND METHODS OF PREPARATION

(71) Applicants: Abuzar Kabir, Miami, FL (US); Kenneth G. Furton, Homestead, FL (US)

(72) Inventors: Abuzar Kabir, Miami, FL (US); Kenneth G. Furton, Homestead, FL (US)

(73) Assignee: THE FLORIDA INTERNATIONAL UNIVERSITY BOARD OF TRUSTEES, Miami, FL (US)

( * ) Notice: Subject to any disclaimer, the term of this patent is extended or adjusted under 35 U.S.C. 154(b) by 0 days.

(21) Appl. No.: 17/675,828

(22) Filed: Feb. 18, 2022

(51) Int. Cl.

| | | |
|---|---|---|
| *B01D 15/30* | (2006.01) |
| *B01D 15/32* | (2006.01) |
| *B01J 20/20* | (2006.01) |
| *B01J 20/26* | (2006.01) |
| *B01J 20/28* | (2006.01) |
| *B01J 31/04* | (2006.01) |
| *B01J 27/10* | (2006.01) |

(52) U.S. Cl.
CPC .......... *B01J 20/262* (2013.01); *B01D 15/305* (2013.01); *B01D 15/322* (2013.01); *B01D 15/325* (2013.01); *B01J 20/20* (2013.01); *B01J 20/28047* (2013.01); *B01J 27/10* (2013.01); *B01J 31/04* (2013.01); *B01J 2220/46* (2013.01)

(58) Field of Classification Search
CPC .... B01J 20/262; B01J 20/20; B01J 20/28047; B01J 27/10; B01J 31/04; B01J 2220/46; B01D 15/305; B01D 15/322; B01D 15/325

See application file for complete search history.

(56) References Cited

U.S. PATENT DOCUMENTS

| | | |
|---|---|---|
| 9,925,515 B1 | 3/2018 | Kabir et al. |
| 9,925,518 B2 | 3/2018 | Kabir et al. |
| 10,183,270 B1 | 1/2019 | Kabir et al. |
| 10,335,767 B2 | 7/2019 | Kabir et al. |

OTHER PUBLICATIONS

Han, Lijun et al. "Streamlined sample cleanup using combined dispersive solid-phase extraction and in-vial filtration for analysis of pesticides and environmntal pollutants in shrimp," Analytica Chimica Acta 827 (2014), pp. 40-46.

Lehotay, Seven J. and Mostovska, Katerina, "Evaluation of Two Fast and Easy Methods for Pesticide Residue Analysis in Fatty Food Matrixes," Journal of AOAC International vol. 88, No. 2 pp. 630-638, 2005.

(Continued)

*Primary Examiner* — Benjamin L Lebron
(74) *Attorney, Agent, or Firm* — Saliwanchik, Lloyd & Eisenschenk

(57) ABSTRACT

The invention provides a sorbent material comprising a PSA that is synthesized via a sol-gel process. The sorbent material enables higher loading of PSA and other functional groups than conventional sorbents. The sorbent material can further encapsulate carbonaceous and/or non-carbonaceous particles that are distributed throughout the sorbent network. The invention also relates to a method of making the sorbent materials.

20 Claims, 6 Drawing Sheets

(56) References Cited

OTHER PUBLICATIONS

Li Li et al. "Use of graphitic carbon black and primary secondary amine for determination of 17 organophosphorus pesticide residues in spinach," J. Sep. Sci. 2008, vol. 31, pp. 3588-3594.

Restek, Sample Preparation Applications—Fast, Simple QuEChERS Extraction and Cleanup of Pesticide Residue Samples, Lit. Cat. # GNAN1097A (2009)(www.restek.com).

Ye, Michael et al. "Analysis of Multi-Pesticide Residues in Vegetables, Food, and Fruits by SPE/GC-MS," SUPELCO, https://www.sigmaaldrich.com/deepweb/assets/sigmaaldrich/marketing/global/documents/416/315/t405020h.pdf.

UCT (www.unitedchem.com), Enviro, QuEChERS Informational Booklet, Pesticide Residue Analysis.

Stenerson, Katherine et al. "Increase Removal of Fat and Pigment from Avocado Extracts Prior to GC-MS Analysis of Pesticide and Metabolite Residues," Reporter 31.2 (sigma-aldrich.com/food).

PSA-FUNCTIONALIZED SOL-GEL SORBENT MATERIALS AND METHODS OF PREPARATION

BACKGROUND OF THE INVENTION

Sample preparation is one of the most important, yet highly neglected steps in the analytical workflow. Typically, agricultural products such as fruits, vegetables, meat, grains, and dairy products undergo solid-liquid extraction to bring the target analyte(s) into the organic solvent phase. Biological samples such as blood and plasma undergo liquid-liquid extraction for the same purpose to bring target analyte(s) into the organic phase. However, due to the indiscriminate extraction of all the extractable materials along with the target analytes present in the sample matrix, the organic phase cannot be injected into the chromatographic system (such as gas chromatography (GC) or liquid chromatography (LC)) unless a rigorous matrix cleanup step is imposed. However, such step is often challenging, time consuming, laborious, as well as error prone.

The primary objectives of typical sample preparation include: (a) elimination or reduction of matrix interferences; (b) concentration of the target analyte(s) before analysis in order to meet the detection sensitivity of the analytical instrument; and (c) replacement of solvent if the solvent containing the analyte(s) is not compatible with the analytical instrument. While in recent years, there has been efforts to create simple, compact, and eco-friendly sample preparation techniques especially in the fields of food and environmental analyses, existing techniques fail to address some or all of the primary objectives.

For example, many of the recently developed extraction sorbents are not effective in recovering a sufficient amount of the target analyte(s) or reducing sample interferents to an acceptable level. Interferents often include organic acids, polar pigments, sugar, and hundreds of other unwanted chemicals. When the sample matrix contains acidic interferents, pigments, and unwanted non-polar compounds, a new sample preparation technique known as QuEChERS (Quick, Easy, Cheap, Effective, Rugged, and Safe) is frequently used. QuEChERS typically involves the use of one or more salts and a Primary Secondary Amine (PSA) sorbent material. PSA is a widely used sorbent, generally used to clean the sample matrix of organic compounds that act as interferents.

Depending on the types of interferents that need to be removed, QuEChERS may be performed with additional sorbents such as particles comprising alkyl silanes with 18 hydrocarbons, called C18, and/or graphitized carbon black (GCB). Typically, C18 is used when a sample contains fat molecules. GCB is generally useful for removing pigments, sterols, and nonpolar interferents. Other traditional sorbents that are used for matrix clean up include glass beads, polymeric sorbents, Florisil®, alumina, and silica. Even with various combinations of these and other sorbents, interferents still remain with the target analytes in many instances. Failure to remove these unwanted chemicals compromises the performance of the analytical instrument and undermines the quality of analytical data.

Another approach utilizing strong and weak anion-exchange sorbents in solid phase extraction (SPE) or graphitized carbon black/aminopropyl sorbents have improved the sample matrix cleanup to some extent, but still failed to remove a high amount of fatty acid from the matrix and required large volume of chlorinated organic solvents.

These problems largely arise due to the way many sorbents are constructed. In the typical synthesis of sorbents containing PSA for example, PSA is often grafted onto the surface of micro spherical silica particles. As a result, the loading of PSA functional groups remains at a relatively low level. This results in requiring a high amount of the PSA sorbent in order to clean up the matrix interferents. However, utilizing a high amount of sorbents necessitates increasing other reagents (e.g., solvents), which can be costly and time-consuming. Higher amounts of other reagents in turn requires additional steps such as evaporation or replacement of solvents as well as reconstitution of recovered analytes. These operations are error prone and increase the risk of losing target analyte(s). The same concerns apply to other functional groups (such as C18) that are similarly grafted on particles.

Thus, there is a need to increase the load of functional groups in a given mass of sorbent without sacrificing sorbent functions and while reducing the risk of errors in sample preparation processes.

Sorbents produced by an acid and base catalyzed sol-gel process have been described in, for example, U.S. Pat. Nos. 9,925,515; 9,925,518; and 10,183,270. However, methods utilizing a base catalyst such as ammonium hydroxide ($NH_4OH$) tend to result in rapid gelation that is difficult to control, leading to a formation of a weak, highly branched, and unpredictable polymeric network.

Thus, there is also a need for a more economical and controllable condensation step in the sol-gel manufacturing process that allows for increased loading of PSA functional groups as well as incorporation of carbonaceous and/or non-carbonaceous particles.

BRIEF SUMMARY OF THE INVENTION

In one embodiment, the present invention provides a sol-gel sorbent material comprising a PSA functional group. The material is prepared via a sol-gel process involving hydrolysis and condensation of precursors. The precursors comprise a primary metal oxide precursor and a PSA-functionalized metal oxide precursor. In some embodiments, the primary metal oxide precursor is one or more types of alkoxysilane, and the PSA-functionalized metal oxide precursor is a silane having a PSA functional group. In some embodiments, the precursors further comprise an additional metal oxide precursor.

In other embodiments, the present invention relates to a sol-gel sorbent material comprising a PSA functional group, the sorbent material encapsulating carbonaceous and/or non-carbonaceous particles. The material is prepared via a sol-gel process involving hydrolysis of precursors and condensation of the hydrolyzed precursors in the presence of carbonaceous and/or non-carbonaceous particles. The precursors comprise a primary metal oxide precursor and a PSA-functionalized metal oxide precursor. In some embodiments, the primary metal oxide precursor is one or more types of alkoxysilane, and the PSA-functionalized metal oxide precursor is a silane having a PSA functional group. In further embodiments, the particles are carbonaceous, such as carbon black, activated carbon, graphene, Multi-Walled Carbon Nanotubes (MWCNTs), and Single Walled Carbon Nanotubes (SWCNT). In other embodiments, the precursors further comprise an additional metal oxide precursor.

Another aspect of the invention relates to the process of synthesizing a sorbent material comprising a PSA functional group via a sol-gel process. In some embodiments, the material encapsulates carbonaceous and/or non-carbonaceous particles. The process involves hydrolysis of precursors and condensation of the hydrolyzed precursors, and in some embodiments, in the presence of carbonaceous and/or non-carbonaceous particles. The precursors comprise a primary metal oxide precursor and a PSA-functionalized metal oxide precursor. In some embodiments, the precursors further comprise an additional metal oxide precursor.

Another aspect of the invention relates to a method of absorbing or adsorbing a sample component by using the sorbent material of the present invention. Because the sorbent material according to the present invention does not require support (e.g., silica particles), to which functional groups are grafted as in the case of commercially available PSA sorbents, higher loading of the functional groups than in conventional sorbents is possible. This results in higher extraction/separation efficiency in sample preparation utilizing the sorbent material of the present invention.

The sorbent material has a sponge-like porous architecture that allows elution solvents to permeate within itself, further contributing to improved efficiency. Additionally, higher loading reduces the amount of the required sorbent for a given sample preparation, which in turn contributes to conservation of organic solvents that are required for elution. The small volume of required elution solvents can reduce subsequent error prone steps such as solvent evaporation and sample reconstitution. Moreover, the ability to combine a variety of functional groups and carbonaceous and/or non-carbonaceous particles broadens its application in various extraction/separation settings.

The sorbent material of the present invention has various applications in the fields of food analysis, pharmaceutical analysis, environmental analysis, toxicological analysis, clinical analysis, forensic analysis, as well as environmental remediation and antimicrobial and/or other protective coatings in food or pharmaceutical packaging.

DETAILED DESCRIPTION OF THE INVENTION

Figure 1:
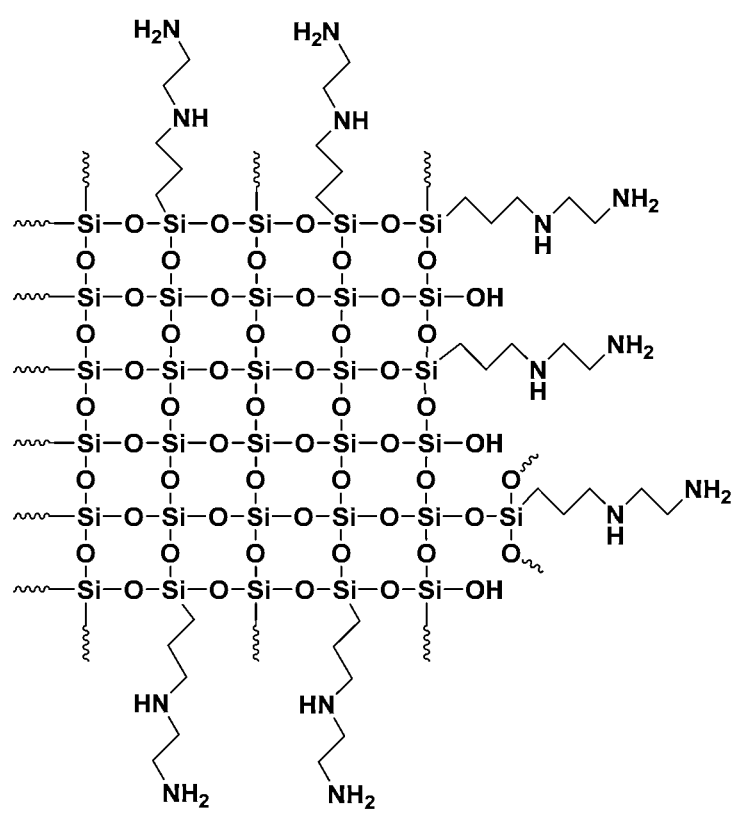
FIG. 1 shows a schematic representation of a sorbent material that is an embodiment of the present invention, comprising PSA.
Figure 2:
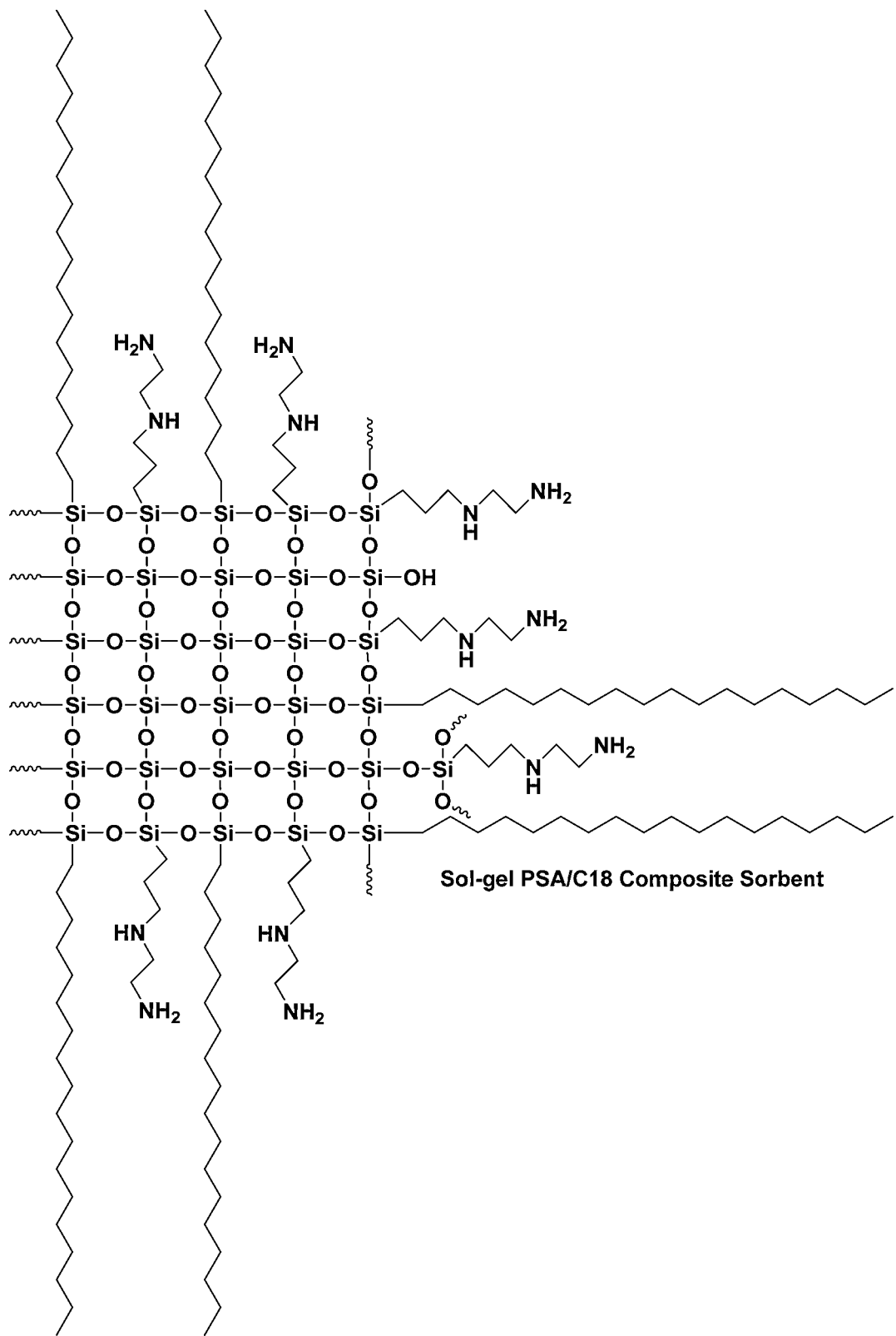
FIG. 2 shows a schematic representation of a sorbent material that is an embodiment of the present invention, comprising PSA and C18.
Figure 3:
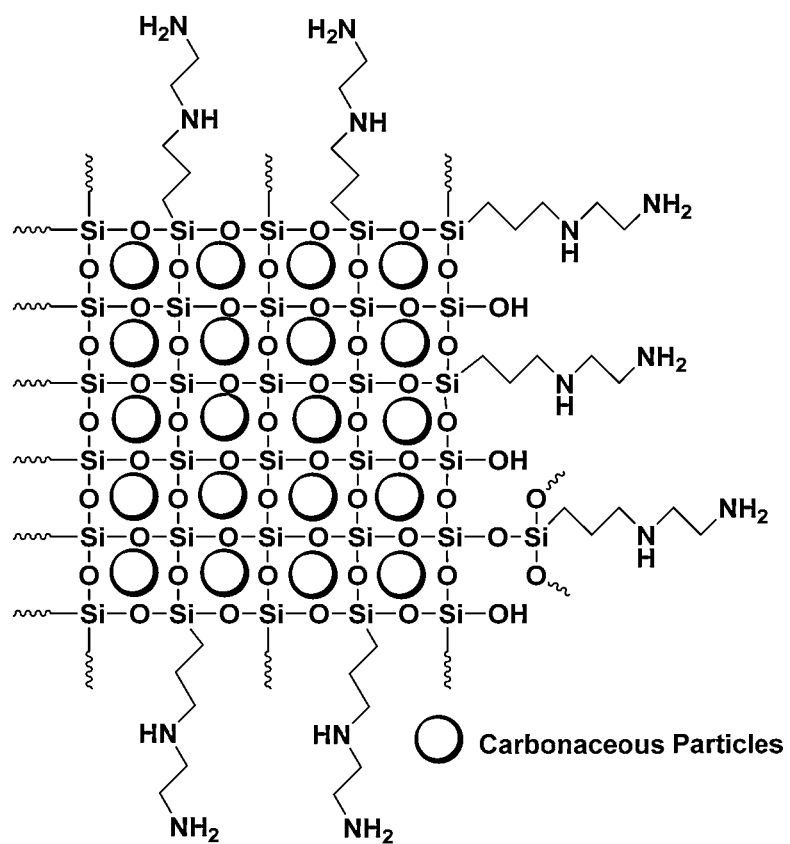
FIG. 3 shows a schematic representation of a sorbent material that is an embodiment of the present invention, comprising PSA and encapsulating carbonaceous particles.
Figure 4:
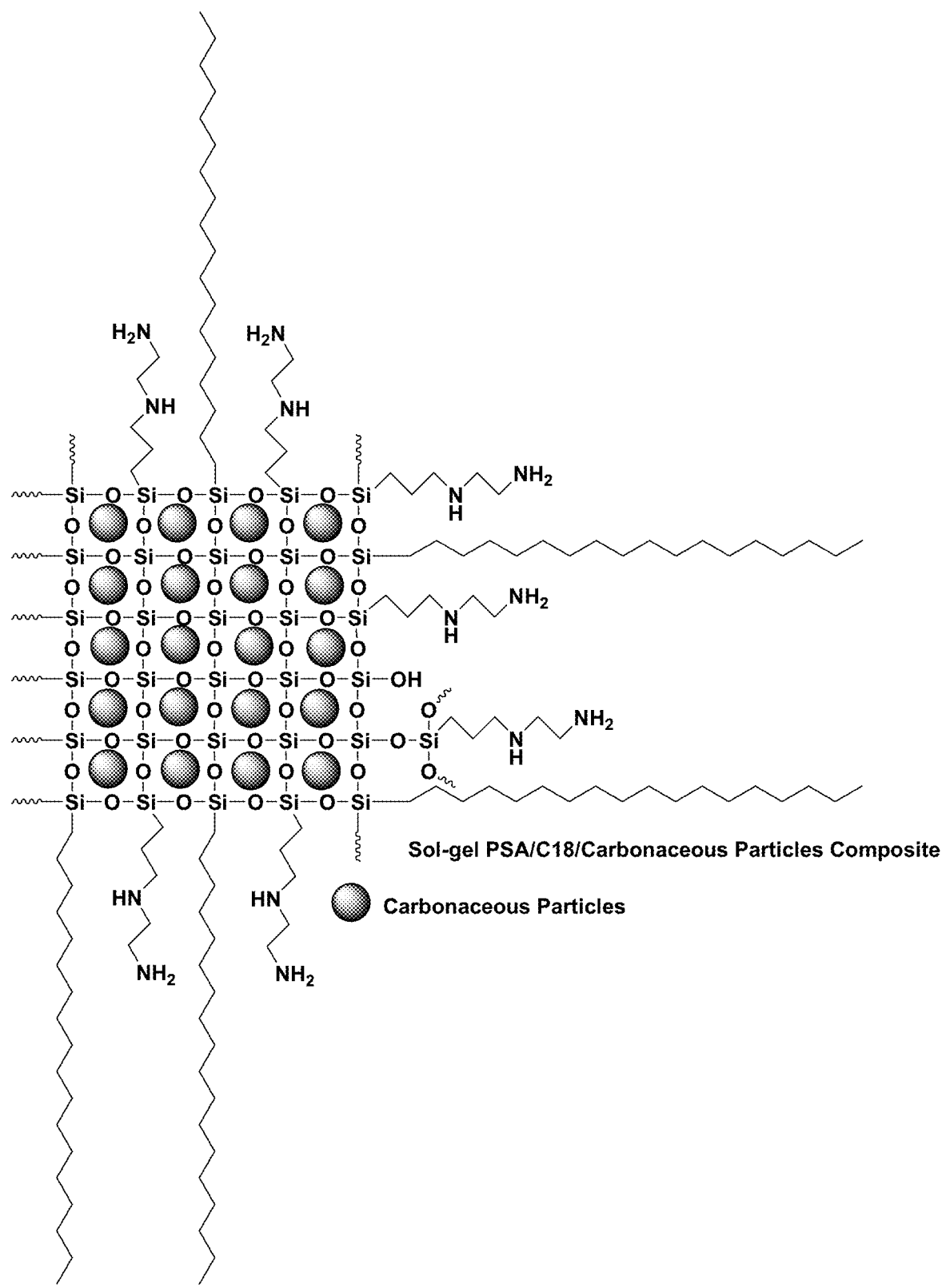
FIG. 4 shows a schematic representation of a sorbent material that is an embodiment of the present invention, comprising PSA and C18, and encapsulating carbonaceous particles.

The present invention is directed to a sorbent material comprising a PSA functional group, methods of synthesis, and uses thereof. The sorbent material according to the present invention is a product of a sol-gel process, which involves hydrolysis of metal oxide precursors and condensation of the hydrolyzed precursors. In some embodiments, an acid catalyst is utilized for the hydrolysis but an independent base catalyst is not used for the condensation. Depending on the precursors used, the resulting material is a gel network of metal-oxo (M-O-M) or metal-hydroxo (M-OH-M) polymers to which PSA functional groups are covalently bonded. This material can be reduced to a desired particulate size. Advantageously, the material may further comprise carbonaceous and/or non-carbonaceous particles that are encapsulated within the network.

The sol-gel synthetic steps of hydrolysis and condensation are advantageously simple. The synthetic steps according to the present invention is economical and environmentally conscious, as it involves a few steps, many of which are carried out at room temperature, and does not require a high volume of organic solvents.

The sol-gel process according to the present invention proceeds by hydrolysis of precursors and condensation of the hydrolyzed precursors. The process forms a colloidal solution ("sol") of the precursors, which subsequently evolves into a three-dimensional polymeric network ("gel"). The sol-gel precursors according to the present invention comprise at least a primary metal oxide precursor and a PSA-functionalized metal oxide precursor. In some embodiments, the primary metal oxide precursor and PSA-functionalized metal oxide precursor can be combined before they are hydrolyzed. Alternatively, hydrolysis or partial hydrolysis can be separately carried out for the primary metal oxide precursor and/or PSA-functionalized metal oxide precursor before they are combined for condensation.

In some embodiments, the precursors further comprise an additional metal oxide precursor having a functional group other than those of the primary metal oxide precursor and the PSA-functionalized metal oxide precursor. This additional metal oxide precursor can be added separately to the reaction mixture during the sol-gel synthesis. In some embodiments, the additional metal oxide precursor is first mixed with the primary metal oxide precursor or the PSA-functionalized metal oxide precursor before all of the precursors are mixed together.

In some embodiments, an acid catalyst is used to facilitate hydrolysis of the metal oxide precursors. When an acid catalyst, such as hydrochloric acid (HCl), trifluoroacetic acid (TFA), or acetic acid, is used, hydrolysis proceeds faster than condensation, which results in an open and linear network with relatively little branching. In an embodiment of the invention, the sol-gel process is carried out by initially employing an acid catalyst, to give a high proportion of hydrolyzed primary metal oxide precursors that also condense to begin forming a gel network. Thereafter the PSA-functionalized metal oxide precursor is combined with this reaction mixture to complete the condensation process such that the PSA functional groups are covalently bonded to the gel network. In some embodiments, the condensation step is base catalyzed.

In other embodiments, the sol-gel process according to the present invention requires no independent base catalyst. Advantageously, some embodiments of the present invention provide a sol-gel synthetic process in which the PSA-functionalized metal oxide precursor serves a dual role of being a source of PSA and a base catalyst. Using the PSA-functionalized metal oxide precursor according to the present invention reduces the occurrence of uncontrollable gelation and facilitates the formation of a stronger and more predictable network of polymers. Therefore, some embodiments according to the present invention provides the sol-gel process comprising the following steps:

(a) mixing one or more primary metal oxide precursors and at least one acid catalyst to obtain a "sol" mixture; and (b) combining said sol mixture and a PSA-functionalized metal oxide precursor to obtain a gel without an independent base catalyst to form a PSA-functionalized sorbent material.

The sol-gel synthesis can be carried out in a solvent. The solvent can be any solvent that can be removed to a large degree. The solvent can be, but is not limited to, methanol, ethanol, n-propanol, i-propanol, diethyl ether, ethyl acetate, tetrahydrofuran, acetone, methylene chloride, chloroform, acetonitrile, dimethyl sulfoxide, or any compatible mixture thereof. The solvent is preferably one that can be removed by evaporation or washed from the sol-gel material by a volatile solvent.

The temperature at which the sol-gel synthesis according to the present invention is carried out may be room temperature (i.e., about 20° C. to about 25° C.) to about 60° C. In some embodiments the temperature is raised only for the specified step(s) of the sol-gel process to facilitate hydrolyzation of metal oxide precursors and/or ageing of the gel after the precursors are combined in a reaction vessel to start forming a gel. The temperature at such steps is preferably about 40° C. to about 60° C., more preferably about 50° C. and is maintained between about 12 hours to about 48 hours.

In some embodiments of the invention, carbonaceous and/or non-carbonaceous particles are added to the reaction mixture. Typically, the carbonaceous and/or non-carbonaceous particles are neutral. As such, they can be added at any point of the sol-gel synthesis, so long as the addition results in encapsulation of the particles within the gel network structure. In some embodiments, the carbonaceous and/or non-carbonaceous particles are initially mixed with PSA-functionalized metal oxide precursors before being mixed with primary metal oxide precursors. In other embodiments, the carbonaceous and/or non-carbonaceous particles are added concurrently with, or subsequent to, the mixing of the PSA-functionalized metal oxide precursors and primary metal oxide precursors.

After the completion of the gel formation, the resulting product undergoes washing and drying processes, followed by a process to reduce the gel into a desired particle size such as crushing or grinding. Drying may take place at room temperature, or at a higher temperature so long as the temperature does not disrupt the integrity of the gel. The final product has a distinct porous metal oxide architecture with desired functional groups incorporated in the network that act as interaction sites for sample analytes/interferents. The types of functional groups and carbonaceous/non-carbonaceous materials present in the sorbent material can be tailored to particular analytes or interferents. For example, activated charcoal (also called activated carbon) is often used to clean pigments from the sample matrix. A sorbent material comprising a PSA-functionalized sol-gel sorbent encapsulating activated charcoal may clean organic fatty acids and pigments simultaneously from the sample matrix.

The primary metal oxide precursors according to the present invention are capable of forming a porous network structure via a sol-gel process, and to which functionalized metal oxide precursors covalently bond. The primary metal oxide precursors have the following general formula (I):

with M being silicon, titanium, aluminum, zirconium, tantalum, germanium, barium, gallium, indium, thallium, vanadium, cobalt, nickel, chromium, copper, iron, zinc, boron, lanthanum, or niobium. At least two of $R_1$, $R_2$, $R_3$, and $R_4$ are independently alkoxy, carboxyl, hydroxy, halide, or dialkylamino. In some embodiments, the remaining $R_1$, $R_2$, $R_3$, and $R_4$ independently are absent, H or comprise alkyl moieties, arylene moieties, cyanoalkyl moieties, fluoroalkyl moieties, phenyl moieties, cyanophenyl moieties, biphenyl moieties, cyanobiphenyl moieties, dicyanobiphenyl, cyclodextrin moieties, crown ether moieties, cryptand moieties, calixarene moieties, or any derivative thereof. The nature of the metal oxide precursors is herein largely exemplified by formula (I) and silanes, but the equivalent with other metals and number of substituents can be readily appreciated by practitioners of the art.

In some embodiments, the primary metal oxide precursors are silane precursors, such as alkoxysilanes. Examples of alkoxysilanes include, but are not limited to, alkyltrialkoxysilanes (e.g., methyltrimethoxysilane (MTMS), methyltriethoxysilane, ethyltriethoxysilane) and tetraalkoxysilanes (e.g., tetramethyl orthosilicate (TMOS), Tetraethyl orthosilicate (TEOS)).

In some embodiments, the silane precursor is tetramethyl orthosilicate (TMOS) as shown in formula (II).

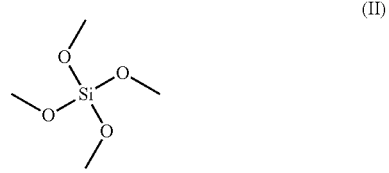

In other embodiments, the silane precursor is methyltrimethoxysilane (MTMS) as shown in formula (III):

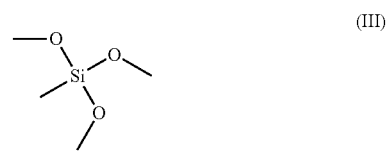

The primary metal oxide precursor according to the invention can comprise one type of metal oxide precursor or a mixture of two or more types of metal oxide precursors. As a way of non-limiting example, it is contemplated that a mixture of TMOS and MTMS can be used as the primary metal oxide precursor according to the present invention.

In some embodiments, the primary metal oxide precursors may comprise a metal oxide precursor having hydrocarbons that can be useful in sorbents for extracting compounds having non-polar or neutral characteristics. Typically, such hydrocarbon chains range from C3 to C50. In specific embodiments, the primary metal oxide precursor having hydrocarbons is an octadecyltrialkoxysilane (such as octadecyltrimethoxysilane (OTMS)), which comprises 18 carbon atoms ("C18").

Further examples of silane precursors as the primary metal oxide precursors include, but are not limited to, an n-octyltrialkoxysilane and a 3-cyanopropyltrialkoxysilane, with the trialkoxy groups being trimethoxy and/or triethoxy groups in certain embodiments.

Other nonlimiting examples of silane precursors as the primary metal oxide precursors include tetraacetoxysilane, tetrachlorosilane, tetradialkylaminosilane or the like. In like manner, a tetraalkoxytitanate can be used as a titania precursor, trialkoxyaluminum can be used as an alumina precursor, and other metal alkoxides can be the source of zirconia, tantalum oxide, germania, barium oxide, gallium oxide, indium oxide, thallium oxide, vanadium oxide, cobalt oxide, nickel oxide, chromium oxide, copper oxide, iron oxide, zinc oxide, boron oxide lanthanum oxide, or niobium oxide.

When different primary metal oxide precursors are used, the different precursors can be combined before they are hydrolyzed. Alternatively, hydrolysis or partial hydrolysis of each type of primary metal oxide precursor can be separately carried out before they are combined.

The PSA-functionalized metal oxide precursors according to the present invention include metal oxide precursors having a Primary Secondary Amine (PSA) functional group that can act as interaction sites for interferents or analytes. PSAs contain both primary and secondary amines in a given moiety. The PSA-functionalized metal oxide precursors have the same general formula (I), except at least one of $R_1$, $R_2$, $R_3$, and $R_4$ contains a PSA functional group. Preferably, the PSA-functionalized metal oxide precursors are silanes having PSA as a functional group. In certain embodiments, the PSA-functionalized metal oxide precursors are trialkoxysilanes or trihydroxysilanes with a substituent having a PSA functional group. Non-limiting examples of PSA-functionalized silane precursors include those listed in Table 1 below.

In some embodiments of the present invention, the precursors may further comprise an additional metal oxide precursor having a functional group other than those of the primary metal oxide precursor and the PSA-functionalized metal oxide precursor. Such different functional group may provide an affinity for a target analyte/interferent that is same as, similar to, or different from the target analyte/interferent of PSA or functional groups of the primary metal oxide precursor.

In some embodiments, the additional metal oxide precursors have the same general formula (I), except at least one of $R_1$, $R_2$, $R_3$, and $R_4$ contains a functional group other than those of the primary metal oxide precursor and the PSA-functionalized metal oxide precursor. Non-limiting examples of the additional metal oxide precursors include an N-trialkoxysilylpropyl-N,N,N-ammonium chloride and a 3-mercaptopropyltrialkoxysilane. In other embodiments, the additional metal oxide precursors can contain organic polymers, macromers, dendrimers, and/or biopolymers as functional groups.

In further embodiments, the sorbent material may further comprise carbonaceous and/or non-carbonaceous particles that can by themselves function as sorbents. The particles can be added at any point of the sol-gel synthesis, so long as the addition results in encapsulation of the particles within the gel network structure. In some embodiments, the particles are added to the reaction mixture as condensation takes place such that the particles become encapsulated within the network structure of the sorbent material. Non-limiting examples of carbonaceous and/or non-carbonaceous particles include, but are not limited to, metal oxides (e.g., titanium dioxides, aluminum oxides, iron oxides), organic polymeric materials such as polystyrene divinyl benzene, carbon blacks (including graphitized carbon blacks (GCB)), activated carbon (AC), mesoporous carbon (MPC), carbon nanotubes, Multi-Walled Carbon Nanotubes (MWCNTs), Single Walled Carbon Nanotubes (SWCNT),

TABLE 1

| | PSA-Functionalized Silane Precursor | Chemical Structure |
|---|---|---|
| 1. | (3-Trimethoxysilylpropyl)diethylenetriamine | 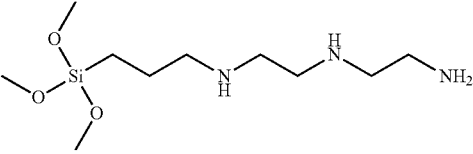 [SMILES: CO[Si](CCCNCCNCCN)(OC)OC] |
| 2. | N-(2-Aminoethyl)-3-aminopropyltrimethoxysilane | 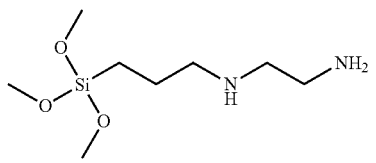 |
| 3. | N-(2-Aminoethyl)-3-aminopropylsilanetriol | 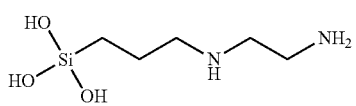 [SMILES: NCCNCCC[Si](O)(O)O] |
| 4. | (Aminoethylaminomethyl)phenethyltrimethoxysilane | 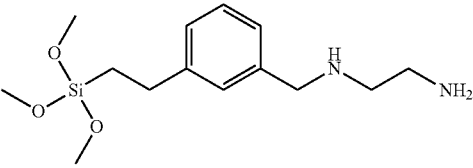 [SMILES: CO[Si](CCc1cccc(CNCCN)c1)(OC)OC] | graphene, fullerenes, biochars, Carboxen, Caropack, carbon nanohorns, carbon nanofibers, graphitic carbon nitride, and their composites. In other embodiments, the carbonaceous and non-carbonaceous particulate matter encapsulated in the sorbent material can include an organic polymer bound within the polymeric network, as illustrated in U.S. Pat. No. 10,183,270, which is incorporated herein in its entirety by reference.

Sol-gel chemistry offers a unique bottom-up synthesis approach where, instead of using silica or other metal oxide particles as inert support to attach functional groups to free silanols or metal hydroxides on the particle surface, a network formed by condensation of hydrolyzed precursors enables homogeneous distribution of the interaction sites over the gel network by covalently bonding the functional groups within its polymeric network, and in some embodiments, by encapsulating carbonaceous and/or non-carbonaceous particles. The resulting sorbent material offers a high surface area of available interaction sites and thus a greater number of readily accessible interaction sites for the components being separated per unit mass of the sorbent.

The present invention improves the current sample preparation practices for, e.g., agricultural and biological samples in various ways.

As a nonlimiting example, quality and efficiency of sample preparation are improved by the sorbent material according to the present invention, because of a higher loading of functional groups that act as interaction sites for various sample analytes/interferents compared to the same unit mass of existing sorbents on the market. Commercial PSA sorbents, for example, are created on silica substrate with limited carbon and nitrogen loading (e.g., about 8.4% C and about 3.3% N in a commercially available PSA sorbent). The sorbent material according to the present invention on the other hand, due to the substrate-free synthesis strategy, offers substantially higher carbon and nitrogen loading (e.g., 16.8% C and 5.3% N in one embodiment) by adjusting the carbon and nitrogen composition of the sol solution. Higher loading of carbon and nitrogen compared to their commercial counterpart offers similar or better performance in terms of analyte recovery and interferents removal even when a smaller quantity of the new sorbent is used.

In connection with efficiency, the sorbent material according to the present invention reduces the number of required steps for sample preparation. In conventional methods, if a sample contains both organic acids (e.g., oleic acid) and color pigments, the sample is first processed using a sorbent such as activated charcoal to remove the color pigments, then passed through a PSA sorbent to remove the organic acids. This is a two-step process and time consuming. On the other hand, certain sorbent embodiments of the present invention are capable of removing both the organic acids and color pigments in a single step by incorporating carbonaceous particles within the PSA sorbent matrix.

Furthermore, the sorbent material of the present invention creates a sponge-like porous network that allows rapid and unhindered permeation of the sample throughout the sorbent bed. This facilitates the necessary interactions between the analytes/interferents and the interaction sites. This also improves quality and efficiency of sample preparation, as increased permeation, in combination with high loading of functional groups, offers high analyte recovery and improved interferents cleanup.

The structure of the sorbent material also contributes to the conservation of resources. For example, commercial PSA sorbents require a high volume of organic solvent to elute target analytes. Thus, a subsequent solvent evaporation and sample reconstitution are always needed. In the present invention, the porous morphology of the sorbent material helps to back-extract the analytes using a low volume of organic elution solvent(s). The lower volume of elution solvents is also facilitated by the reduced amount of the sorbent material used (due to its higher loading of functional groups). Moreover, the sponge-like porous architecture of the sorbent material according to the present invention would allow easy dissipation of the organic solvent for analytes elution. As such, the laborious, time consuming and error-prone step of solvent evaporation and sample reconstitution after target analyte extraction can be minimized, if not eliminated, from the sample preparation workflow.

The sol-gel approach according to the present invention also allows a creation of diverse combinations and ratios of interaction sites in the sorbent material, tailored to individual samples to be analyzed. For example, commercially available sorbents are available in limited combinations of PSA/C18 or PSA/GCB. On the other hand, the present invention allows a sorbent material to have various combinations and relative proportions of interaction sites. This also enables facile modification and adjustment of the selectivity of the sorbents to make the clean-up process more efficient. Variations in the interaction sites can be created in relatively simple steps without any major modification in the sol-gel process.

Exemplary interaction sites in the sorbent materials according to the present invention include, but are not limited to: a PSA interaction site only ("sol-gel PSA"); PSA and long-chain hydrocarbon such as C18 ("sol-gel PSA+ C18"); PSA and carbonaceous particles such as Graphitized Carbon Black (sol-gel PSA+GCB), Multi-Walled Carbon Nanotubes (sol-gel PSA+MWCNT), Single Walled Carbon Nanotubes (sol-gel PSA+SWCNT), activated carbon (sol-gel PSA+AC), or graphene (sol-gel PSA+Graphene); or combinations of PSA, C18, and carbonaceous particles such as GCB (sol-gel PSA+C18+GCB).

Additionally, the manner in which the interaction sites are combined and integrated within the sorbent materials is another advantageous aspect of the invention. Conventional methods of sample preparation combine sorbents in a way that physically separate them from one another—e.g., the sorbents are individually provided and separated with frits inside the solid phase extraction (SPE) cartridge. Due to their separate existence inside the SPE cartridge, the sorbents cannot offer any synergistic effect, which are often seen in composite systems. Furthermore, the installation of separate sorbent layers inside the SPE cartridge is commercially challenging and laborious. On the other hand, embodiments of the present invention offer a sorbent material that comprises functional groups that are homogeneously attached to the gel network. In some embodiments, the carbonaceous and/or non-carbonaceous particles are also homogenously encapsulated within the network of the present invention. The blended interaction sites within the gel network simplify their application in various extraction methods such as solid phase extraction (SPE) cartridges as well as in dispersive solid phase extraction (dSPE). Moreover, the sorbent material of the present invention provides the possibility of synergistic effects that cannot be accomplished with conventional combinations of physically separated sorbents.

As skilled artisans would appreciate upon reading the present disclosure, the sorbent material of the present invention can be used in a number of formats. Non-limiting applications include: the coating on fused silica glass fiber, metal rod, or plate (such as in Solid Phase Microextraction, SPME), fabric support (Fabric phase sorptive extraction, FPSE), magnet inserted glass tube (Stir bar sorptive extraction, SBSE); as a monolithic bed (Capsule Phase Microextraction, CPME); as solid phase extraction sorbent (such as in SPE cartridge); in matrix solid phase dispersion (MSPD), in dispersive solid phase extraction (dSPE), or in magnetic solid phase dispersion. Further non-limiting applications include stationary phases in reversed phase liquid chromatography (RP-HPLC), normal phase liquid chromatography (NP-HPLC), hydrophilic interaction chromatography (HI-LAC). These applications are useful in, for example, the fields of food analysis, pharmaceutical analysis, environmental analysis, toxicological analysis, clinical analysis, and forensic analysis. The sorbent material of the present invention can also be used for environmental remediation and antimicrobial and/or other protective coatings in food or pharmaceutical packaging.

Materials and Methods
Solution Preparation:

1. Preparation of 2,000 ppm Benzoic Acid Solution for Example 5

50,000 ppm benzoic acid solution was first prepared by dissolving 500 mg of benzoic acid in 10 mL of ethanol. 4 mL of this 50,000-ppm benzoic acid solution was diluted with 96 mL of DI water to make 100 mL of 2,000 ppm benzoic acid solution.

2. Preparation of 2,000 ppm Oleic Acid Solution Example 6

50,000 ppm benzoic acid solution was first prepared by dissolving 500 mg of oleic acid in 10 mL of ethanol. 4 mL of this 50,000-ppm oleic acid solution was diluted with 96 mL of DI water to make 100 mL of 2,000 ppm oleic acid solution.

PSA Sorbent Preparation and Analysis

The PSA sorbents in Examples 5 and 6 were prepared and analyzed according to the following protocol:
1. Weigh 100 mg of sorbent sample into Eppendorf Tube;
2. Activate sorbent with 1 mL Acetonitrile (ACN) for 10 min;
3. Discard ACN;
4. Wash with DI water;
5. Discard DI water;
6. Analyze the 2000 ppm oleic acid/benzoic acid solution in HPLC
7. Transfer the sorbent into the extraction vial using either the benzoic acid solution or oleic acid solution;
8. Extract with the sorbent in 10 mL 2000 ppm oleic acid/benzoic acid solution for 1 hour;
9. After 1 hour, transfer an aliquot of the individual solution into Eppendorf tube and centrifuge for 5 min;
10. Analyze the supernatant in HPLC.

Detection of Benzoic Acid and Oleic Acid in Examples 5 and 6

Detection of benzoic acid and oleic acid was performed using a high-performance liquid chromatography equipped with an UV detector (Agilent 1100 HPLC-UV with the parameters provided below). Mobile phases were prepared in the following manner:

For Benzoic Acid:
1. 30% Acetonitrile containing 0.1% Formic Acid
2. 50% 0.1% Formic Acid Solution (pH 2.3): Add 200 μL of Formic Acid in an Erlenmeyer flask and add HPLC grade water up to the mark. Shake well to make a homogenous solution.
3. Detection: 230 nm, Flow rate: 1.0 mL/min, Injection: 10 μL, room temperature.

For Oleic Acid:
1. 95% Methanol
2. 5% 0.1% acetic acid (200 μL in 200 mL DI water)
3. Detection: 205 nm, Flow rate: 1.0 mL/min, Injection: 10 μL, Temperature: 30° C.

EXAMPLES

Following are Examples, which are offered by way of illustration and are not intended to limit the invention. Various modifications or changes will be suggested to persons skilled in the art and are to be included within the spirit and purview of this disclosure. Unless otherwise stated, these Examples utilized the methods, techniques, and materials as described in Materials and Methods above or known to those skilled in the art.

Example 1: Preparation of Sol-Gel PSA Sorbent 1

Formulation Example

TABLE 2

| Composition of Reaction Mixtures for Sol-Gel PSA Sorbent 1 | |
|---|---|
| Solution A | Solution B |
| 1. Tetramethyl Orthosilicate (TMOS) 6,000 μL<br>2. Isopropanol 35,000 μL<br>3. HCl (0.1 M) 2,900 μL<br>4. Trifluoroacetic acid (TFA) (100%) 900 μL<br>The mixture of components 1-3 was hydrolyzed at 50° C. for 12 hours before component 4 was added. | 1. (Aminoethyl aminomethyl) phenethyltrimethoxysilane (PSA) 3,000 μL<br>2. Isopropanol 15,000 μL |

Preparation Process:
Solution A 6,000 μL of tetramethyl orthosilicate (TMOS) and 35,000 μL of isopropanol were mixed together in a 50 mL reaction vessel. 2,900 μL of HCl (0.1M, $H_2O$) was added to this mixture with continuous stirring. The mixture was hydrolyzed at 50° C. for 12 hours. Subsequently, 900 μL of 100% trifluoroacetic acid (TFA) was added to control the pH of the solution.

Solution B

In a second reaction vessel, 3,000 μL of (aminoethyl aminomethyl) phenethyltrimethoxysilane (PSA) and 15,000 μL of isopropanol were mixed together.

Solution A was transferred into a wide mouth glass vessel. Solution B was added to solution A in steps under continuous stirring. The resulting sol solution formed gel in approximately 2 hours to make sol-gel PSA, which was subsequently aged at 50° C. for 48 hours. Thereafter, the sol-gel PSA material was crushed and dried at 70° C. for 24 hours. The dried gel was washed with 50:50 (v/v) methanol:$CH_2Cl_2$ under sonication for 1 hour. The slurry was filtered on a vacuum filter. The clean sol-gel PSA material was dried again at 70° C. for 24 hours and ground into small particles in a mortar and pestle.

Example 2: Preparation of Sol-Gel PSA Sorbent 2

Formulation Example

TABLE 3

Composition of Reaction Mixtures for Sol-gel PSA Sorbent 2

| Solution A | Solution B |
| --- | --- |
| 1. Tetramethyl Orthosilicate (TMOS) 6,000 μL<br>2. Isopropanol 35,000 μL<br>3. HCl (0.1 M) 2,280 μL<br>4. TFA (100%) 1,450 μL<br>The mixture of components 1-3 was hydrolyzed at 50° C. for 12 hours before component 4 was added. | 1. N-(2-aminoethyl)-3-aminopropyl trimethoxysilane (PSA) 3,000 μL<br>2. Isopropanol 15,000 μL |

Preparation Process:

Solution A 6,000 μL of tetramethyl orthosilicate (TMOS) and 35,000 μL of isopropanol were mixed together in a 50 mL reaction vessel. 2,280 μL of HCl (0.1M, $H_2O$) was added to this mixture with continuous stirring. The mixture was hydrolyzed at 50° C. for 12 hours. Subsequently, 1,450 μL of 100% TFA was added to control the pH of the solution.

Solution B

In a second reaction vessel, 3,000 μL of N-(2-aminoethyl)-3-aminopropyl trimethoxysilane (PSA) and 15,000 μL of isopropanol were mixed together.

Solution A was transferred into a wide mouth glass vessel. Solution B was added to solution A in steps under continuous stirring. The resulting sol solution formed gel in approximately 2 hours to make sol-gel PSA, which was subsequently aged at 50° C. for 48 hours. Thereafter, the sol-gel PSA material was crushed and dried at 70° C. for 24 hours. The dried gel was washed with 50:50 (v/v) methanol:$CH_2Cl_2$ under sonication for 1 hour. The slurry was filtered on a vacuum filter. The clean sol-gel PSA material was dried again at 70° C. for 24 hours and ground into small particles in a mortar and pestle.

Example 3: Preparation of Sol-Gel PSA+C18 Composite Sorbent

Formulation Example

TABLE 4

Composition of Reaction Mixtures for Sol-gel PSA + C18 Composite Sorbent

| Solution A | Solution B |
| --- | --- |
| 1. Tetramethyl Orthosilicate (TMOS) 6,000 μL<br>2. Octadecyltrimethoxysilane (C18) 3,000 μL<br>3. Isopropanol 35,000 μL<br>4. HCl (0.1 M) 2,900 μL<br>5. TFA (100%) 1,450 μL<br>The mixture of components 1-4 was hydrolyzed at 50° C. for 12 hours before component 5 was added. | 1. N-(2-aminoethyl)-3-aminopropyl trimethoxysilane (PSA) 3,000 μL<br>2. Isopropanol 15,000 μL |

Preparation Process:
Solution A 6,000 µL of TMOS, 3,000 µL octadecyltrimethoxysilane (C18), and 35,000 µL isopropanol were mixed together in a 50 mL reaction vessel. 2,900 µL of HCl (0.1M, H$_2$O) was added to this mixture with continuous stirring. The mixture was hydrolyzed at 50° C. for 12 hours. Subsequently, 1,450 µL of TFA (100%) was added to the solution.

Solution B

In a second reaction vessel, 3,000 µL of N-(2-aminoethyl)-3-aminopropyl trimethoxysilane (PSA) and 15,000 µL isopropanol were mixed together.

Solution A was transferred into a wide mouth glass vessel. Solution B was added to solution A in steps under continuous stirring. The resulting sol solution formed gel in approximately 2 hours to make sol-gel PSA+C18, which was subsequently aged at 50° C. for 48 hours. Thereafter, the sol-gel PSA+C18 material was crushed and dried at 70° C. for 24 hours. The dried gel was washed with 50:50 (v/v) methanol: CH$_2$Cl$_2$ under sonication for 1 hour. The slurry was filtered on a vacuum filter. The clean sol-gel PSA+C18 material was dried again at 70° C. for 24 hours and ground into small particles in a mortar and pestle.

Example 4: Preparation of Sol-Gel PSA+C18+Activated Carbon Composite Sorbent

Formulation Example

TABLE 5

Composition of Reaction Mixtures for Sol-gel PSA + C18 + Activated Carbon Composite Sorbent

| Solution A | Solution B |
|---|---|
| 1. Tetramethyl Orthosilicate (TMOS) 6,000 µL<br>2. Octadecyltrimethoxysilane (C18) 3,000 µL<br>3. Isopropanol 35,000 µL<br>4. HCl (0.1 M) 2,900 µL<br>5. TFA (100%) 1,450 µL<br>The mixture of components 1-4 was hydrolyzed at 50° C. for 12 hours before component 5 was added. | 1. N-(2-aminoethyl)-3-aminopropyl trimethoxysilane (PSA) 3,000 µL<br>2. Isopropanol 15,000 µL<br>3. Activated Carbon (AC) 0.1 g |

Preparation Process:
Solution A 6,000 µL of TMOS, 3,000 µL of octadecyltrimethoxysilane (C18), and 35,000 µL of isopropanol were mixed together in a 50 mL reaction vessel. 2,900 µL of HCl (0.1M, H$_2$O) was added to this mixture with continuous stirring. The mixture was hydrolyzed at 50° C. for 12 hours. Subsequently, 1,450 µL of TFA (100%) was added to the solution.

Solution B

In a second reaction vessel, 3,000 µL of N-(2-Aminoethyl)-3-aminopropyl trimethoxysilane (PSA) and 15,000 µL of isopropanol were mixed together. 0.1 g of activated carbon (AC) was also added to this solution.

Solution A was transferred into a wide mouth glass vessel. Solution B was added to solution A in steps under continuous stirring. The resulting sol solution formed gel in approximately 2 hours to make sol-gel PSA+C18+AC, which was subsequently aged at 50° C. for 48 hours. Thereafter, the sol-gel PSA+C18+AC material was crushed and dried at 70° C. for 24 hours. The dried gel was washed with 50:50 (v/v) methanol: CH$_2$Cl$_2$ under sonication for 1 hour. The slurry was filtered on a vacuum filter. The clean sol-gel PSA+C18+AC material was then dried at 70° C. for 24 hours and ground into small particles in a mortar and pestle.

Example 5: Preparation of Sol-Gel PSA+C18+Graphitized Carbon Black Composite Sorbent Formulation Example

TABLE 6

Composition of Reaction Mixtures for Sol-gel PSA + C18 + Graphitized Carbon Black Composite Sorbent

| Solution A | Solution B |
|---|---|
| 1. Tetramethyl Orthosilicate (TMOS) 6,000 µL<br>2. Octadecyltrimethoxysilane (C18) 3,000 µL<br>3. Isopropanol 35,000 µL | 1. N-(2-aminoethyl)-3-aminopropyl trimethoxysilane (PSA) 3,000 µL<br>2. Isopropanol 15,000 µL |

TABLE 6-continued

Composition of Reaction Mixtures for Sol-gel PSA + C18 + Graphitized Carbon Black Composite Sorbent

| Solution A | Solution B |
|---|---|
| 4. HCl (0.1 M) 2,900 μL | 3. Graphitized Carbon Black (GCB) 0.6 g |
| 5. TFA (100%) 700 μL | |
| The mixture of components 1-4 was hydrolyzed at 50° C. for 12 hours before component 5 was added. | |

Preparation Process:
Solution A 6,000 μL of TMOS, 3,000 μL of octadecyltrimethoxysilane (C18), and 35,000 μL isopropanol were mixed together in a 50 mL reaction vessel. 2,900 μL of HCl (0.1M, $H_2O$) was added to this mixture with continuous stirring. The mixture was hydrolyzed at 50° C. for 12 hours. Subsequently, 700 μL TFA (100%) was added to the solution.
Solution B In a second reaction vessel, 3,000 μL of N-(2-aminoethyl)-3-aminopropyl trimethoxysilane (PSA) and 15,000 μL of isopropanol were mixed together. 0.6 g of graphitized carbon black (GCB) was added to this solution.

Solution A was transferred into a wide mouth glass vessel. Solution B was added to solution A in steps under continuous stirring. The resulting sol solution formed gel in approximately 2 hours to make sol-gel PSA+C18+GCB, which was aged at 50° C. for 48 hours. Thereafter, the sol-gel PSA+C18+GCB material was crushed and dried at 70° C. for 24 hours. The dried gel was washed with 50:50 (v/v) methanol: $CH_2Cl_2$ under sonication for 1 hour. The slurry was filtered on a vacuum filter. The clean sol-gel PSA+C18+GCB material was then dried at 70° C. for 24 hours and ground into small particles in a mortar and pestle.

Example 6: Benzoic Acid Adsorption by PSA Sorbents

A study was conducted to compare the amount of adsorption of benzoic acid by a commercial PSA sorbent (United Chemical PSA) and various sorbent materials of the present invention, numbered and provided as below:
1. United Chemical PSA sorbent
2. Sol-gel PSA
3. Sol-gel PSA+GCB
4. Sol-gel PSA+C18
5. Sol-gel PSA+C18+GCB
6. Sol-gel PSA+MWCNT
7. Sol-gel PSA+Graphene
8. Sol-gel PSA+Activated Carbon Sample numbers 2 through 8 were synthesized according to the methods similar to those described in the previous Examples.

100 mg of each of the sorbent was exposed to a 10 mL of 2,000 ppm benzoic acid solution (i.e., 20 mg of benzoic acid) for 1 hour under constant stirring at 600 rpm. Each solution was analyzed before and after adding the PSA sorbents. The loss in the chromatographic area was attributed to the adsorption by the sorbents.

Figure 5:
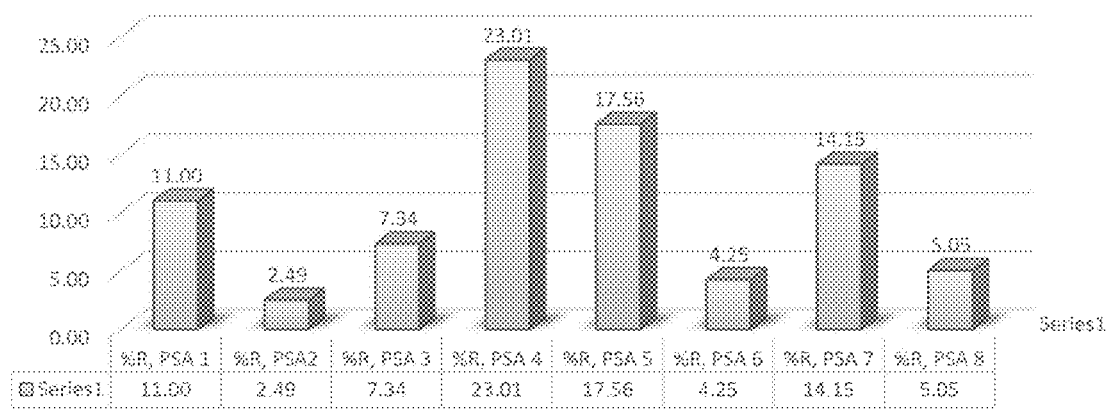
FIG. 5 shows a graph comparing the adsorption of benzoic acid by various sorbent materials including a commercially available sorbent (labeled as "PSA 1") and sorbent materials according to the present invention (labeled as "PSA 2" through "PSA 8").

As the data in FIG. 5 reveal, Sample numbers 4, 5, 7 (labeled as "PSA 4", "PSA 5", and "PSA 7", respectively) demonstrated significantly higher adsorption of benzoic acid compared to their commercial counterpart, suggesting the superior performance of Sample numbers 4, 5, 7 with respect to benzoic acid adsorption.

Example 7: Oleic Acid Adsorption by PSA Sorbents

A study was conducted to compare the amount of adsorption of oleic acid by a commercial PSA sorbent (United Chemical PSA) and the same sorbent materials of the present invention as described in Example 6.

100 mg of each of the sorbent was exposed to 10 mL of 2,000 ppm oleic acid extraction solution (i.e., 20 mg of oleic acid) for 1 hour under constant stirring at 600 rpm. Each solution was analyzed before and after adding the PSA sorbents. The loss in the chromatographic area was attributed to the adsorption by the PSA sorbents.

Figure 6:
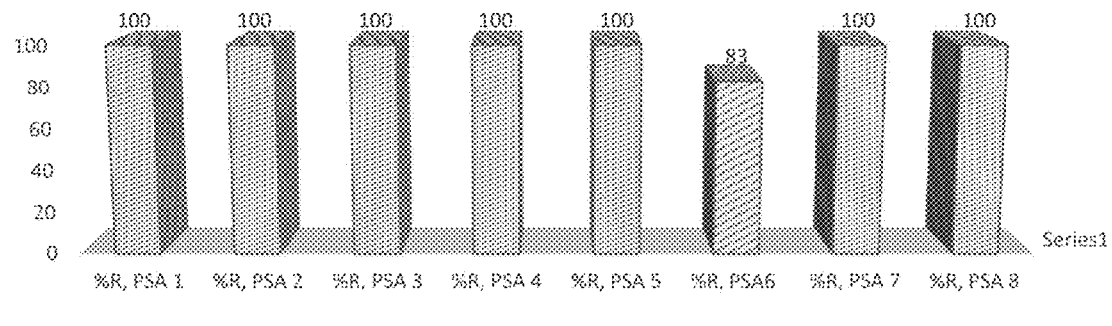
FIG. 6 shows a graph comparing the adsorption of oleic acid by various sorbent materials including a commercially available sorbent (labeled as "PSA 1") and sorbent materials according to the present invention (labeled as "PSA 2" through "PSA 8").

As demonstrated in FIG. 6, the PSA sorbent samples prepared according to the present invention performed comparably to their commercial counterpart, suggesting the superior adsorption performance of the PSA sorbent samples of the present invention with respect to another acidic compound, i.e., oleic acid.

As used herein, the singular forms "a," "an," and "the" are intended to include the plural forms as well, unless the context clearly indicates otherwise. Furthermore, to the extent that the terms "including," "includes," "having," "has," "with," or variants thereof are used in either the detailed description and/or the claims, such terms are intended to be inclusive in a manner similar to the term "comprising." The transitional terms/phrases (and any grammatical variations thereof) "comprising," "comprises," and "comprise" can be used interchangeably; "consisting essentially of," and "consists essentially of" can be used interchangeably; and "consisting," and "consists" can be used interchangeably.

The transitional term "comprising," "comprises," or "comprise" is inclusive or open-ended and does not exclude additional, unrecited elements or method steps. By contrast, the transitional phrase "consisting of" excludes any element, step, or ingredient not specified in the claim. The phrases "consisting" or "consists essentially of" indicate that the claim encompasses embodiments containing the specified materials or steps and those that do not materially affect the basic and novel characteristic(s) of the claim. Use of the term "comprising" contemplates other embodiments that "consist" or "consisting essentially of" the recited component(s).

The term "about" or "approximately" means within an acceptable error range for the particular value as determined by one of ordinary skill in the art, which will depend in part on how the value is measured or determined, i.e., the limitations of the measurement system. For example, "about" can mean within 1 or more than 1 standard deviation, per the practice in the art. Alternatively, "about" can mean a range of up to 0-20%, 0 to 10%, 0 to 5%, or up to 1% of a given value. Where particular values are described in the application and claims, unless otherwise stated the term "about" meaning within an acceptable error range for the particular value should be assumed.

When ranges are used herein, such as for dose ranges, combinations and sub-combinations of ranges (e.g., sub-ranges within the disclosed range), specific embodiments therein are intended to be explicitly included.

All patents, patent applications, provisional applications, and publications referred to or cited herein are incorporated by reference in their entirety, including all figures and tables, to the extent they are not inconsistent with the explicit teachings of this specification.

We claim:

1. A sorbent material comprising a Primary Secondary Amine (PSA)-functionalized metal oxide network produced from hydrolysis and condensation of precursors, said precursors comprising one or more primary metal oxide precursor and one or more PSA-functionalized metal oxide precursor, said one or more primary metal oxide precursor having the following general formula (I):

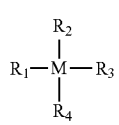

(I)

M being silicon, titanium, aluminum, zirconium, tantalum, germanium, barium, gallium, indium, thallium, vanadium, cobalt, nickel, chromium, copper, iron, zinc, boron, lanthanum, or niobium; and at least two of $R_1$, $R_2$, $R_3$, and $R_4$ being independently alkoxy, carboxyl, or hydroxy;

the remaining $R_1$, $R_2$, $R_3$, and $R_4$ independently being absent, H or comprising alkyl moieties, arylene moieties, cyanoalkyl moieties, fluoroalkyl moieties, phenyl moieties, cyanophenyl moieties, biphenyl moieties, cyanobiphenyl moieties, dicyanobiphenyl, cyclodextrin moieties, crown ether moieties, cryptand moieties, calixarene moieties, or any derivative thereof;

said PSA-functionalized metal oxide precursor having said general formula (I), with the proviso that at least one of $R_1$, $R_2$, $R_3$, and $R_4$ comprises a PSA functional group;

said sorbent material further comprising carbonaceous and/or non-carbonaceous particles being encapsulated within said network;

said hydrolysis and condensation are carried out in the absence of an independent base catalyst; and said one or more PSA functional group and said carbonaceous and/or non-carbonaceous particles being homogeneously distributed within said network.

2. The sorbent material of claim 1, said one or more primary metal oxide precursor comprising alkyltrialkoxysilane and/or tetraalkoxysilane.

3. The sorbent material of claim 2, said tetraalkoxysilane being tetramethyl orthosilicate.

4. The sorbent material of claim 2, said one or more PSA-functionalized metal oxide precursor comprising a silane having a PSA.

5. The sorbent material of claim 4, said silane having a PSA being (3-Trimethoxysilylpropyl) diethylenetriamine, N-(2-Aminoethyl)-3-aminopropyltrimethoxysilane, N-(2-Aminoethyl)-3-aminopropylsilanetriol, (Aminoethylaminomethyl) phenethyltrimethoxysilane, or any combination thereof.

6. The sorbent material of claim 2, further comprising an additional metal oxide precursor.

7. The sorbent material of claim 4, at least one of said alkyltrialkoxysilane having a C3-C50 hydrocarbon chain.

8. The sorbent material of claim 7, said alkyltrialkoxysilane having a C3-C50 hydrocarbon chain being octadecyltrimethoxysilane.

9. The sorbent material of claim 4, said carbonaceous and/or non-carbonaceous particles being metal oxide, carbon black, activated carbon, mesoporous carbon, carbon nanotubes, Multi-Walled Carbon Nanotube, Single Walled Carbon Nanotube, graphene, fullerene, carbon nanohorn, carbon nanofiber, graphitic carbon nitride, their composites, or any combination thereof.

10. A method of synthesizing a PSA-functionalized sorbent material according to claim 1 comprising:
    mixing a primary metal oxide precursor and at least one acid catalyst to obtain a sol mixture;
    combining said sol mixture and a PSA-functionalized metal oxide precursor without a separate base catalyst to obtain a gel to form the PSA-functionalized sorbent material.

11. The method according to claim 10, said primary metal oxide precursor being alkyltrialkoxysilane and/or tetraalkoxysilane.

12. The method according to claim 11, said PSA-functionalized metal oxide precursor being a silane having a PSA.

13. The method according to claim 12, an additional metal oxide precursor being added prior to the gel formation.

14. The method according to claim 10, said acid catalyst comprising hydrochloric acid (HCl), trifluoroacetic acid (TFA), acetic acid, or any combination thereof.

15. The method according to claim 12, carbonaceous and/or non-carbonaceous particles being added prior to the gel formation.

16. A method of absorbing or adsorbing a sample component comprising:
    providing the sorbent material of claim 1; and
    contacting said sorbent material with solid, liquid, or gas comprising said component.

17. The method according to claim 16, said method being performed as part of solid phase extraction, dispersive solid phase extraction, solid-phase microextraction, matrix solid phase dispersion, magnetic solid phase dispersion, Capsule Phase Microextraction, Fabric phase sorptive extraction, or Stir bar sorptive extraction.

18. The method according to claim 16, said method being performed as part of reversed phase liquid chromatography (RP-HPLC), normal phase liquid chromatography (NP-HPLC), and hydrophilic interaction chromatography (HI-LAC).

19. The sorbent material of claim 4, the sorbent material being capable of removing an organic acid and color pigments from a sample comprising a mixture of analytes in a single step.

20. A sorbent material comprising a Primary Secondary Amine (PSA)-functionalized metal oxide network produced from hydrolysis and condensation of precursors, said precursors comprising one or more primary metal oxide precursor and one or more PSA-functionalized metal oxide precursor, said one or more primary metal oxide precursor being alkyl trialkoxysilane and/or tetraalkoxysilane, said PSA-functionalized metal oxide precursor being a substituted alkyl trialkoxysilane and/or trihydroxysilane with said substitution comprising a PSA functional group, said sorbent material further comprising carbonaceous and/or non-carbonaceous particles being encapsulated within said network;

said hydrolysis and condensation are carried out in the absence of an independent base catalyst; and said PSA functional group and said carbonaceous and/or non-carbonaceous particles being homogeneously distributed within said network.

* * * * *